US012806455B2

(12) United States Patent
MacKarvich

(10) Patent No.: US 12,806,455 B2
(45) **Date of Patent: *Nov. 24, 2026**

(54) BALANCE MOBILE ANCHOR CART

(71) Applicant: Tie Down, Inc., Atlanta, GA (US)

(72) Inventor: Charles J. MacKarvich, Atlanta, GA (US)

(73) Assignee: Tie Down, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/376,388

(22) Filed: Oct. 31, 2025

(65) Prior Publication Data

US 2026/0054108 A1 Feb. 26, 2026

Related U.S. Application Data

(60) Continuation of application No. 18/382,582, filed on Oct. 23, 2023, now Pat. No. 12,485,302, which is a (Continued)

(51) Int. Cl.
*A62B 35/00* (2006.01)
*B62B 1/00* (2006.01)

(Continued)

(52) U.S. Cl.
CPC ............ *A62B 35/0068* (2013.01); *B62B 1/00* (2013.01); *B62B 1/20* (2013.01); *B62B 5/049* (2013.01);

(Continued)

(58) Field of Classification Search
CPC ......... B62B 2301/00; B62B 7/06; B62B 7/10; B62B 7/105; B62B 5/049; B62B 1/008;

(Continued)

(56) References Cited

U.S. PATENT DOCUMENTS

| | | | |
|---|---|---|---|
| 1,082,160 | A | 12/1913 | Kurowski |
| 1,261,142 | A | 4/1918 | Mcnichol |

(Continued)

FOREIGN PATENT DOCUMENTS

| | | | |
|---|---|---|---|
| AT | 524903 | A1 | 10/2022 |
| CA | 2336426 | C | 5/2004 |

(Continued)

OTHER PUBLICATIONS

Final Office Action for U.S. Appl. No. 18/382,582, dated Apr. 14, 2025, 10 pages.

(Continued)

*Primary Examiner* — Taylor Morris

(74) *Attorney, Agent, or Firm* — Buchalter LLP

(57) ABSTRACT

A method of using an anchor cart assembly includes rolling the anchor cart assembly along a ground surface, the anchor cart assembly comprising a cart and a load, the cart comprising a frame defining a front end and a rear end, the cart comprising an axle assembly, the load configured to add weight to the cart, wherein the axle assembly is positioned in a lowered position; repositioning the axle assembly from the lowered position to a raised position, the load configured to immobilize the anchor cart assembly when the axle assembly is in the raised position; and tilting the anchor cart assembly to a transition position wherein the front end or the rear end of the frame rests upon the ground surface.

31 Claims, 8 Drawing Sheets

Related U.S. Application Data division of application No. 17/493,929, filed on Oct. 5, 2021, now Pat. No. 11,826,589.

(51) Int. Cl.
*B62B 1/20* (2006.01)
*B62B 5/04* (2006.01)
*E04G 21/32* (2006.01)
*B62B 1/26* (2006.01)

(52) U.S. Cl.
CPC .......... *E04G 21/3276* (2013.01); *B62B 1/268* (2013.01); *B62B 2205/14* (2013.01)

(58) Field of Classification Search
CPC .... B62B 1/18; B62B 1/10; B62B 1/00; B62B 1/268; B62B 2205/14; B62B 1/12; B62B 2203/10; B62B 5/0083; B62B 1/20; A62B 35/0068; A62B 99/00; E04G 21/3261; E04G 21/3276; A61G 1/0268
USPC ............. 280/43.17, 43, 43.24, 43.14; 182/3; 248/129
See application file for complete search history.

(56) References Cited

U.S. PATENT DOCUMENTS

| | | | | |
|---|---|---|---|---|
| 1,985,362 | A | 12/1934 | Clyde | |
| 2,319,581 | A | 5/1943 | Brownlee et al. | |
| 2,599,717 | A | 6/1952 | Menzies | |
| 2,878,029 | A | 3/1959 | Karl et al. | |
| 3,353,837 | A | 11/1967 | Stanley | |
| 3,544,127 | A | 12/1970 | Dobson, V | |
| 3,550,244 | A | 12/1970 | Villo et al. | |
| 4,020,959 | A | 5/1977 | Livesay | |
| 4,130,179 | A | 12/1978 | Williams | |
| 4,337,966 | A | 7/1982 | Stevens | |
| 4,412,679 | A | 11/1983 | Mahoney et al. | |
| 4,417,738 | A | 11/1983 | Kendall | |
| 4,496,027 | A * | 1/1985 | Fisher | E04G 3/34 248/237 |
| 4,815,760 | A | 3/1989 | Dooley | |
| 4,991,895 | A | 2/1991 | Artho | |
| 5,006,031 | A | 4/1991 | Fossing et al. | |
| 5,065,838 | A | 11/1991 | Finley | |
| 5,135,078 | A | 8/1992 | Bell et al. | |
| 5,348,326 | A | 9/1994 | Fullenkamp et al. | |
| 5,368,319 | A | 11/1994 | Hummer | |
| 5,411,360 | A | 5/1995 | Hilliker et al. | |
| 5,423,386 | A | 6/1995 | Lapearous | |
| 5,431,254 | A | 7/1995 | Kramer et al. | |
| 5,433,578 | A | 7/1995 | Honan, Jr. | |
| 5,628,522 | A | 5/1997 | Hall | |
| 5,806,111 | A | 9/1998 | Heimbrock et al. | |
| 5,903,956 | A | 5/1999 | Theising | |
| 5,957,649 | A | 9/1999 | English, Jr. et al. | |
| 6,193,319 | B1 * | 2/2001 | Kielinski | B62B 1/16 298/17 B |
| 6,227,553 | B1 | 5/2001 | Palmer | |
| 6,550,791 | B2 | 4/2003 | Ramsey | |
| 6,902,175 | B1 | 6/2005 | Clavey | |
| 6,929,270 | B1 | 8/2005 | Flagstad et al. | |
| 7,004,483 | B1 | 2/2006 | McEntee | |
| 7,032,710 | B2 | 4/2006 | Anderson et al. | |
| 7,063,497 | B2 | 6/2006 | Mast et al. | |
| 7,077,421 | B2 | 7/2006 | Wu | |
| 7,163,212 | B1 | 1/2007 | Rupp | |
| 7,234,720 | B2 | 6/2007 | Borglum | |
| 7,322,586 | B1 | 1/2008 | Zettel | |
| 7,431,314 | B2 | 10/2008 | Donaldson | |
| 7,537,219 | B1 | 5/2009 | Sherwood | |
| 7,584,935 | B2 | 9/2009 | Chen | |
| 7,931,227 | B1 * | 4/2011 | Oudekerk | H02G 1/08 242/594.3 |
| 8,006,984 | B2 | 8/2011 | Chubb | |
| 8,100,228 | B2 | 1/2012 | Hamilton et al. | |
| 8,336,905 | B1 | 12/2012 | Mollhagen et al. | |
| 8,465,031 | B2 | 6/2013 | Coghill, Jr. | |
| 8,584,798 | B2 | 11/2013 | Stoffels et al. | |
| 8,651,510 | B2 | 2/2014 | Fankhauser et al. | |
| 8,727,360 | B2 | 5/2014 | Catford | |
| 8,746,710 | B2 | 6/2014 | Schejbal | |
| 8,752,659 | B1 | 6/2014 | Lenkman et al. | |
| 8,781,677 | B2 | 7/2014 | Roberts et al. | |
| 8,919,361 | B2 | 12/2014 | Ma | |
| 8,960,625 | B2 | 2/2015 | Ma | |
| 8,985,273 | B2 | 3/2015 | Terry | |
| 9,085,313 | B2 | 7/2015 | Mojeski | |
| 9,186,529 | B2 | 11/2015 | Correia | |
| 9,315,141 | B1 | 4/2016 | Piercey, III | |
| 9,340,087 | B2 | 5/2016 | Atkinson | |
| 9,675,824 | B2 | 6/2017 | Mackarvich | |
| 9,758,184 | B1 | 9/2017 | Vaverek | |
| 9,796,106 | B1 | 10/2017 | Chuang | |
| 9,802,771 | B2 | 10/2017 | Kimener et al. | |
| 9,969,548 | B2 | 5/2018 | Fjetland | |
| 10,017,955 | B2 | 7/2018 | Ye | |
| 10,123,921 | B2 | 11/2018 | Paul | |
| 10,183,185 | B2 | 1/2019 | Carroccia et al. | |
| 10,272,316 | B2 | 4/2019 | Hedberg | |
| 10,456,608 | B2 | 10/2019 | Johanneck et al. | |
| 10,828,211 | B2 | 11/2020 | Jönsson | |
| 10,883,281 | B2 | 1/2021 | Carlei | |
| 10,894,554 | B1 | 1/2021 | Mackarvich | |
| 11,104,365 | B2 | 8/2021 | Mackarvich | |
| 11,129,760 | B2 | 9/2021 | Patmore et al. | |
| 11,167,782 | B1 | 11/2021 | Mackarvich | |
| 11,305,803 | B2 | 4/2022 | Mackarvich | |
| 11,613,430 | B2 | 3/2023 | English | |
| 11,826,589 | B2 | 11/2023 | Mackarvich | |
| 12,485,302 | B2 | 12/2025 | Mackarvich | |
| 2005/0057010 | A1 | 3/2005 | Hopper et al. | |
| 2005/0236790 | A1 | 10/2005 | Carter | |
| 2006/0045685 | A1 | 3/2006 | Warner et al. | |
| 2006/0186616 | A1 | 8/2006 | Rudiger | |
| 2007/0289811 | A1 | 12/2007 | Smith | |
| 2008/0301875 | A1 | 12/2008 | Malassigne et al. | |
| 2009/0114478 | A1 | 5/2009 | Hamilton et al. | |
| 2009/0174162 | A1 | 7/2009 | Gass et al. | |
| 2009/0321184 | A1 | 12/2009 | Hamilton | |
| 2012/0285497 | A1 | 11/2012 | Li | |
| 2015/0104279 | A1 | 4/2015 | Kenton | |
| 2016/0325771 | A1 * | 11/2016 | Jackson, Jr. | B62B 1/18 |
| 2016/0332011 | A1 | 11/2016 | Mackarvich | |
| 2019/0201723 | A1 | 7/2019 | Schroeder | |
| 2019/0298590 | A1 | 10/2019 | Patmore et al. | |
| 2020/0079598 | A1 | 3/2020 | Carlei | |
| 2020/0398089 | A1 | 12/2020 | Kelly et al. | |
| 2021/0009183 | A1 | 1/2021 | Mackarvich | |
| 2021/0094599 | A1 | 4/2021 | Mackarvich | |
| 2021/0101288 | A1 | 4/2021 | Lee | |
| 2021/0146982 | A1 | 5/2021 | Anderson | |
| 2021/0354742 | A1 | 11/2021 | Mackarvich | |
| 2022/0258782 | A1 * | 8/2022 | Schambach | B62B 1/008 |
| 2023/0107798 | A1 | 4/2023 | Mackarvich | |
| 2024/0050786 | A1 | 2/2024 | Mackarvich | |

FOREIGN PATENT DOCUMENTS

| | | | |
|---|---|---|---|
| CH | 88083 | A | 5/1921 |
| CN | 106043360 | A | 10/2016 |
| CN | 107458434 | A | 12/2017 |
| CN | 108657242 | A | 10/2018 |
| CN | 109484455 | A | 3/2019 |
| CN | 111619641 | A | 9/2020 |
| CN | 112078650 | A | 12/2020 |
| DE | 102008056591 | A1 | 5/2010 |
| DE | 202020106558 | U1 | 5/2021 |
| EP | 1650100 | A1 | 4/2006 |
| EP | 4155168 | A1 | 3/2023 |
| FR | 2562532 | A1 | 10/1985 |

(56) References Cited

FOREIGN PATENT DOCUMENTS

| | | | |
|---|---|---|---|
| GB | 2195299 | A | 4/1988 |
| WO | 03080186 | A1 | 10/2003 |

OTHER PUBLICATIONS

Notice of Allowance for U.S. Appl. No. 18/382,582, dated Aug. 4, 2025, 8 pages.
Advisory Action for U.S. Appl. No. 17/493,929, dated Nov. 4, 2022, 4 pages.
Applicant-Initiated Interview Summary for U.S. Appl. No. 17/493,929, dated Jun. 20, 2023, 4 pages.
Final Office Action for U.S. Appl. No. 17/493,929, dated Aug. 18, 2022, 15 pages.
Final Office Action for U.S. Appl. No. 17/493,929, dated Mar. 20, 2023, 13 pages.
Final Office Action for U.S. Appl. No. 18/382,582, dated Oct. 18, 2024, 19 pages.
Non-Final Office Action for U.S. Appl. No. 16/510,478, dated Jul. 6, 2020, 12 pages.
Non-Final Office Action for U.S. Appl. No. 17/122,637, dated Jan. 27, 2021, 11 pages.
Non-Final Office Action for U.S. Appl. No. 17/493,929, dated Apr. 21, 2022, 16 pages.
Non-Final Office Action for U.S. Appl. No. 17/493,929, dated Dec. 2, 2022, 12 pages.
Non-Final Office Action for U.S. Appl. No. 18/382,582, dated Feb. 5, 2025, 11 Pages.
Notice of Allowance for U.S. Appl. No. 16/510,478, dated Sep. 22, 2020, 5 pages.
Notice of Allowance for U.S. Appl. No. 17/122,637, dated Apr. 29, 2021, 11 pages.
Notice of Allowance for U.S. Appl. No. 17/386,633, dated Feb. 17, 2022, 16 pages.
Notice of Allowance for U.S. Appl. No. 17/493,929, dated Jul. 21, 2023, 10 pages.
Requirement for Restriction/Election for U.S. Appl. No. 17/493,929, dated Feb. 18, 2022, 6 pages.

* cited by examiner

BALANCE MOBILE ANCHOR CART

CROSS-REFERENCE TO RELATED APPLICATIONS

This application is a continuation of U.S. application Ser. No. 18/382,582, filed Oct. 23, 2023, which is a divisional of U.S. application Ser. No. 17/493,929, filed Oct. 5, 2021, which issued into U.S. Pat. No. 11,826,589 on Nov. 28, 2023, each of which is incorporated herein by reference in its entirety.

TECHNICAL FIELD

This disclosure relates to anchoring for fall arrest and fall restraint safety systems. More specifically, this disclosure relates to an anchor cart assembly for fall arrest and fall restraint safety systems.

BACKGROUND

When workers are working at height or near drop-offs, labor regulations, such as those enforced by the Occupational Safety and Health Administration (OSHA), require that safety precautions be taken to protect the workers against falls. Two common fall protections are fall restraint systems and fall arrest systems ("fall protection systems" in general). Fall restraint systems are utilized to keep workers away from a potential fall hazard, such as an unprotected ledge. The workers may wear harnesses with fixed-length lanyards, which are strategically anchored to prevent the worker from approaching the ledge while still allowing the worker to move about the worksite. By "restraining" the worker from approaching the ledge, the worker is prevented from possibly falling off the ledge.

In contrast, fall arrest systems are intended to safely stop, or "arrest", a worker's freefall after the worker has already fallen over the fall hazard. The fall arrest system prevents the worker from striking a lower surface, such as the ground. The fall arrest system also absorbs the shock of the fall by decelerating the worker in a controlled manner, such as with a tear tape webbing pack or self-retracting lanyard.

Both fall arrest and fall restraint systems depend upon the presence of strong and reliable anchor points to function as intended. In existing facilities, particularly industrial facilities, anchor points may be incorporated directly into the structure itself. However, residential or commercial properties such as apartment buildings, hotels, and office buildings may be less likely to provide anchor points for aesthetic reasons. Also, during the construction of facilities, anchor points may not be easily provided. For example, during the construction of a multi-floor commercial building, the floors are frequently formed from flat slabs of poured concrete. These slabs do not provide any convenient place to attach a lanyard, without permanently damaging the floor by digging or penetrating into its surface.

Another consideration is that workers often must cover large areas during the course of their work, often in multiple directions relative to potential anchor points. For example, glaziers and other workers must install windows around the perimeter of each floor in many office buildings, hotels, or similar developments. These workers must be able to move efficiently from room to room or office to office to install these structures. While doing so, the workers' fall protection systems must be properly anchored to work by the open window frames in each location. Some portable systems rely upon weight to provide a mobile anchor point; however, these systems can be too heavy for a single worker to move by himself or herself.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an anchor cart assembly comprising a cart comprising a frame defining at least one front foot and at least one rear foot, the at least one front foot and the at least one rear foot defining a bottom plane of the frame; and an axle assembly mounted to the frame, the axle assembly being repositionable relative to the frame between a raised position and a lowered position, the axle assembly positioned above the bottom plane in the raised position, at least a portion of the axle assembly positioned below the bottom plane in the lowered position; and a load supported by the cart.

Also disclosed is a cart comprising a frame; an axle assembly comprising an axle shaft; at least one wheel mounted on the axle shaft; and at least one pivot arm coupled to the axle shaft, a first end of the at least one pivot arm being hingedly coupled to the frame; and a jack defining a top end and a bottom end, the top end coupled to the frame, the bottom end coupled to the axle assembly, a jack length being defined between the top end and the bottom end, the jack being reconfigurable between a collapsed configuration and an extended configuration, the jack length being longer in the extended configuration than in the collapsed configuration.

Also disclosed is a method of using an anchor cart assembly, the method comprising rolling a cart of the anchor cart assembly along a ground surface to a work location; and repositioning an axle assembly of the cart from a lowered position to a raised position, the axle assembly contacting the ground surface in the lowered position, the axle assembly spaced above the ground surface in the raised position.

Further disclosed is a method of using an anchor cart assembly to provide fall protection to a worker, the method comprising rolling the anchor cart assembly along a ground surface to a work location, the anchor cart assembly comprising a cart and a load, the cart comprising a frame defining a front end and a rear end, the cart further comprising an axle assembly, the load configured to add weight to the cart, wherein the axle assembly is positioned in a lowered position; repositioning the axle assembly of the cart from the lowered position to a raised position, the load configured to immobilize the anchor cart assembly when the axle assembly is in the raised position; and tilting the anchor cart assembly to a transition position wherein the front end or the rear end of the frame rests upon the ground surface after rolling the anchor cart assembly along the ground surface to the work location and before repositioning the axle assembly of the cart from the lowered position to the raised position.

Additionally, disclosed is a method of using an anchor cart assembly to provide fall protection to a worker, the method comprising rolling the anchor cart assembly along a ground surface to a work location, the anchor cart assembly comprising a cart and a load, the cart comprising a frame defining a front end and a rear end, the cart further comprising an axle assembly positioned between the front end and the rear end, the load configured to add weight to the cart, wherein the axle assembly is positioned in a lowered position, the axle assembly contacting the ground surface in the lowered position, the frame positioned above the ground surface at the front end and the rear end when the axle assembly is in the lowered position and the anchor cart assembly is rolling along the ground surface; repositioning the axle assembly of the cart from the lowered position to a raised position, the front end and the rear end contacting the ground surface when the axle assembly is in the raised position, the load configured to immobilize the anchor cart assembly when the axle assembly is in the raised position; and anchoring the worker to an attachment point defined by the cart.

Also disclosed is an anchor cart assembly comprising a cart comprising a frame and an axle assembly, the frame defining a front end and a rear end, the axle assembly repositionable between a lowered position and a raised position; and a load configured to add weight to the cart and to immobilize the anchor cart assembly when the axle assembly is in the raised position; wherein: the anchor cart assembly is positionable in a transition position when the axle assembly is in the lowered position; and in the transition position, either the front end or the rear end of the frame is configured to rest upon rests upon a ground surface.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
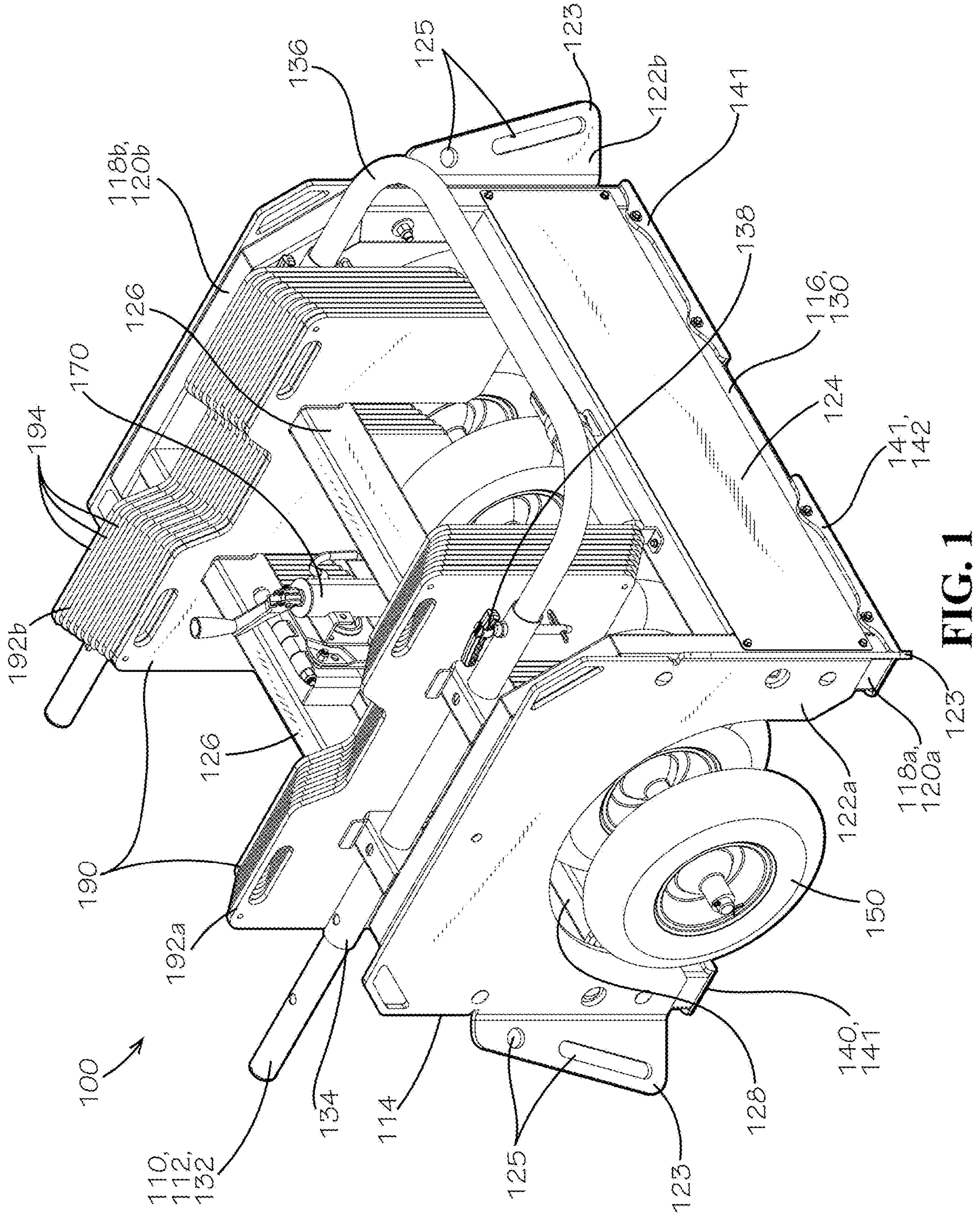
FIG. 1 is a rear perspective view of an anchor cart assembly comprising a cart and a load in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an anchor cart assembly and associated methods, systems, devices, and various apparatus. The anchor cart assembly can comprise a cart and a load. It would be understood by one of skill in the art that the disclosed anchor cart assembly is described in but a few exemplary aspects among many. No particular terminology or description should be considered limiting on the disclosure or the scope of any claims issuing therefrom.

FIG. 1 is a rear perspective view of an anchor cart assembly 100 (referred to hereafter as "the cart assembly 100") comprising a cart 110 and a load 190 in accordance with one aspect of the present disclosure.

The cart 110 can comprise a frame 112, an axle assembly 150, and a jack 170. The frame 112 can define a front end 114 and a rear end 116 disposed opposite from the front end 114. The frame 112 can comprise a first side rail 118*a* and a second side rail 118*b* extending between the front end 114 and the rear end 116. The first side rail 118*a* can be a left arch 120*a*, or first arch, and the second side rail 118*b* can be a right arch 120*b*, or second arch.

The frame 112 can comprise multiple structural members, which can be coupled together with fasteners, welds, or other mechanical attachment mechanisms, such as interference fits. The structural members can be shaped, such as by machining, bending, laser cutting, torch cutting, plasma cutting, or other suitable methods. The frame 112 can comprise tubular members. In the present aspect, the tubular members can be rectangular or square tubes, for example and without limitation. In some aspects, the tubular members can be circular tubes. In some aspects, the frame 112 can comprise tubular members of mixed cross-sectional shapes. In some aspects, the frame 112 can comprise other types of structural members, such as channels, beams, angled stock, bars, or other shapes of structural members or combinations thereof, either in place of or in addition to tubular members. The structural members of the frame 112 can comprise steel, iron, aluminum, or other suitable structural materials, for example and without limitation.

The frame 112 can comprise a front plate 224 (shown in FIG. 2) and a rear plate 124. The front plate 224 and the rear plate 124 can be respectively coupled to the front end 114 and the rear end 116. A pair of side plates 122*a,b* can be coupled to the arches 120*a,b*, respectively. As described below in greater detail, the axle assembly 150 can be configured to move relative to the frame 112. The plates 122*a,b*,124,224 can at least partially close off the frame 112, which can keep the appendages of one or more workers 800 (shown in FIG. 8) away from the axle assembly 150 as it moves. The plates 122*a,b*,124,224 can also add weight to the cart 110, and heavier materials, such as metal plate material, can be utilized to form the plates 122*a,b*,124,224. In some aspects, the plates 122*a,b*,124,224 can comprise laser-cut steel plates. In some aspects, some or all of the plates 122*a,b*,124,224 can comprise a lighter material, such as sheet metal, a polymer, a composite, or other suitable material, for example and without limitation. The side plates 122*a,b* can define wings 123 at four corners of the cart 110, and the wings 123 can define one or more attachments points 125, such as holes, slots, or other shapes capable of receiving a fall protection lanyard. In some aspects, the front plate 224 and/or the rear plate 124 can define some or all of the wings 123. In some aspects, the frame 112 can define the wings 123.

The frame 112 can further comprise at least one top crossmember 126, at least one front crossmember 128, and at least one rear crossmember 130, each extending between the first side rail 118*a* and the second side rail 118*b*. In the present aspect, the load 190 can comprise two weight stacks 192*a,b*, each comprising at least one weight plate 194, as demonstrated by the weight stack 192*b*. The load 190 can be supported by the at least one top crossmember 126.

The frame 112 can further comprise a handle assembly 132, comprising at least one fixed member 134, at least one telescoping member 136, and at least one pin 138. The at least one fixed member 134 can be coupled to the at least one top crossmember 126. The at least one fixed member 134 can receive the at least one telescoping member 136. The at least one telescoping member 136 can telescope relative to the at least one fixed member 134 between a collapsed configuration (shown) and an extended configuration (shown in FIGS. 3, 7, and 8), and intermediate positions therebetween. The at least one pin 138 can engage both the at least one fixed member 134 and the at least one telescoping member 136 to secure the at least one telescoping member 136 relative to the at least one fixed member 134. In the present aspect, the members 134,136 can be tubes, or pipes, with a round profile; however, in other aspects, the tubes can have a different profile, such as rectangular. In some aspects, one or both of the members 134,136 may not be a tube, and instead may be a solid piece, such as a rod or bar, a piece of channel material, or any other suitable structural member. The telescoping members 134,136 can comprise iron, steel, aluminum, or other suitable structural materials.

The frame 112 can define at least one front foot 140 at the front end 114 and at least one rear foot 142 at the rear end 116. In the present aspect, the at least one front foot 140 and the at least one rear foot 142 can each comprise at least one footpad 141. As demonstrated by the rear foot 142, each foot 140,142 can comprise two footpads 141 in some aspects. The footpads 141 can comprise a resilient material, such as a rubber, polymer, or other suitable material. The footpads 141 can be configured to provide traction and/or to prevent marking or damage when the cart 110 is placed on a ground surface 500 (shown in FIGS. 5, 6, and 7). In the present aspect, the feet 140,142 can be respectively defined by the at least one front crossmember 128 and the at least one rear crossmember 130. In some aspects, the feet 140,142 can extend in a front-to-back orientation between the front end 114 and the rear end 116.

Figure 2:
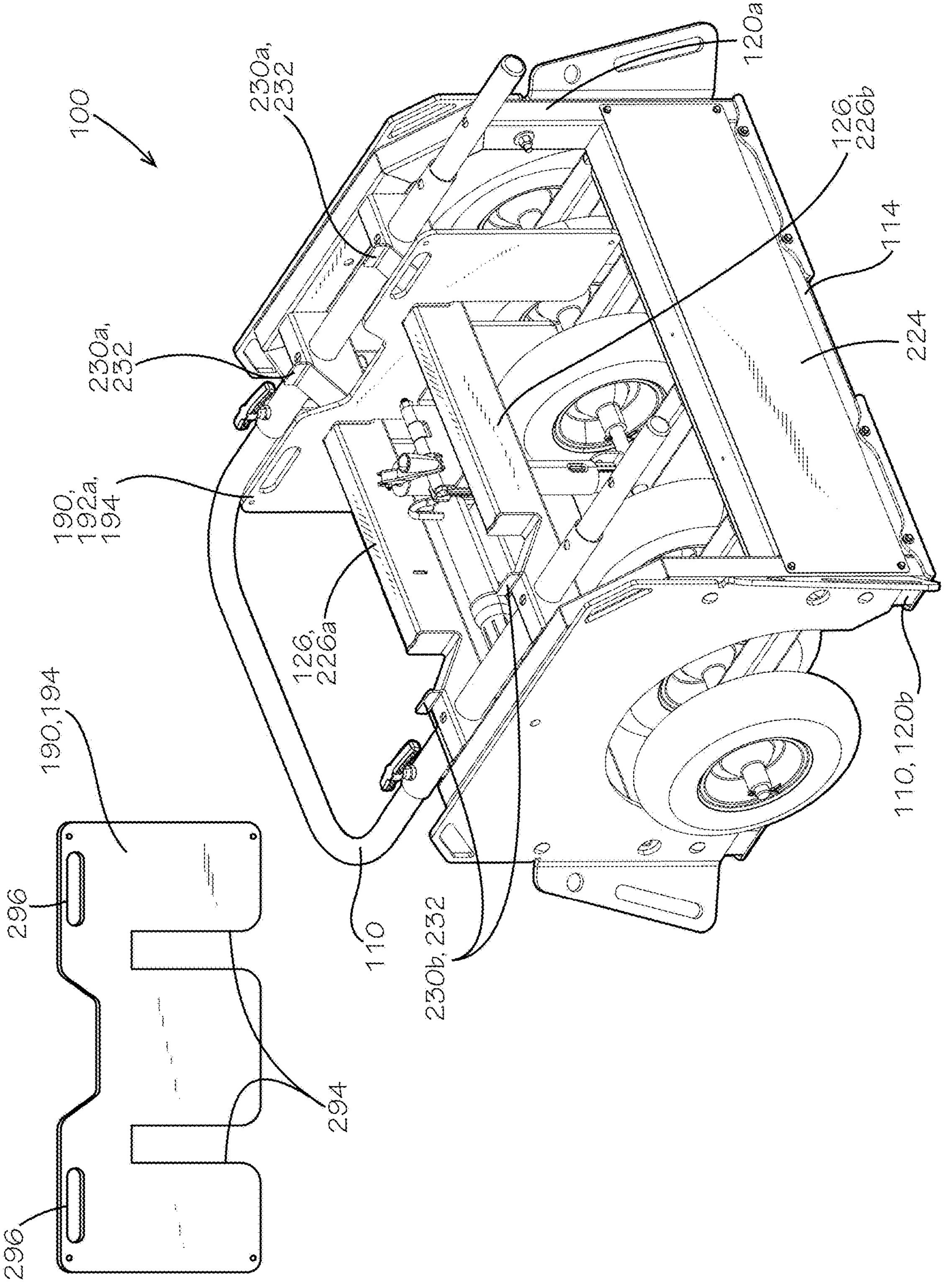
FIG. 2 is a front perspective view of the anchor cart assembly of FIG. 1.

FIG. 2 is a front perspective view of the cart assembly 100 of FIG. 1 with most of the weight plates 194 of the load 190 removed for clarity. Specifically, the cart assembly 100 is shown with the entire weight stack 192*b* (shown in FIG. 1) removed and the weight stack 192*a* shown comprising only one weight plate 194. In various aspects, the load 190, and each weight stack 192*a,b*, can comprise any number of weight plates 194. Additionally, one weight plate 194 is shown in the top left, with respect to the present viewing angle, that has been removed from the cart 110.

The at least one top crossmember 126 can comprise a first top crossmember 226*a* and a second top crossmember 226*b*. In other aspects, the at least one top crossmember 126 can comprise greater or fewer than two top crossmembers 226*a, b*. The top crossmembers 126,226*a,b* can define a first weight rack 230*a* and a second weight rack 230*b*. Each weight rack 230*a,b* can comprise a bracket 232 for each top crossmember 226*a,b* of the at least one top crossmember 126. In the aspect shown, the top crossmembers 226*a,b* can be notched, and the top crossmembers 226*a,b* can receive the brackets 232. In some aspects, the brackets 232 can be positioned atop the top crossmembers 226*a,b*. In some aspects, the brackets 232 can be coupled to and supported by a different portion of the frame 112, such as the arches 120*a,b*.

The weight racks 230*a,b* can be configured to respectively receive the weight stacks 192*a,b* (weight stack 192*b* shown in FIG. 1). As demonstrated by the weight plate 194 at top left, the weight plates 194 can define one or more notches 294 configured to fit over the at least one top member 126 and/or be received by the brackets 232. The brackets 232 can be sloped, which can help the individual weight plates 194 remain positioned neatly together. This can prevent the weight plates 194 from rattling; however, it is not necessary for the brackets 232 to be sloped and should not be viewed as limiting. The weight plates 194 can also define at least one handhole 296. The handholes 296 can be configured to aid in lifting the weight plates 194 on and off of the weight racks 230*a,b*.

Figure 3:
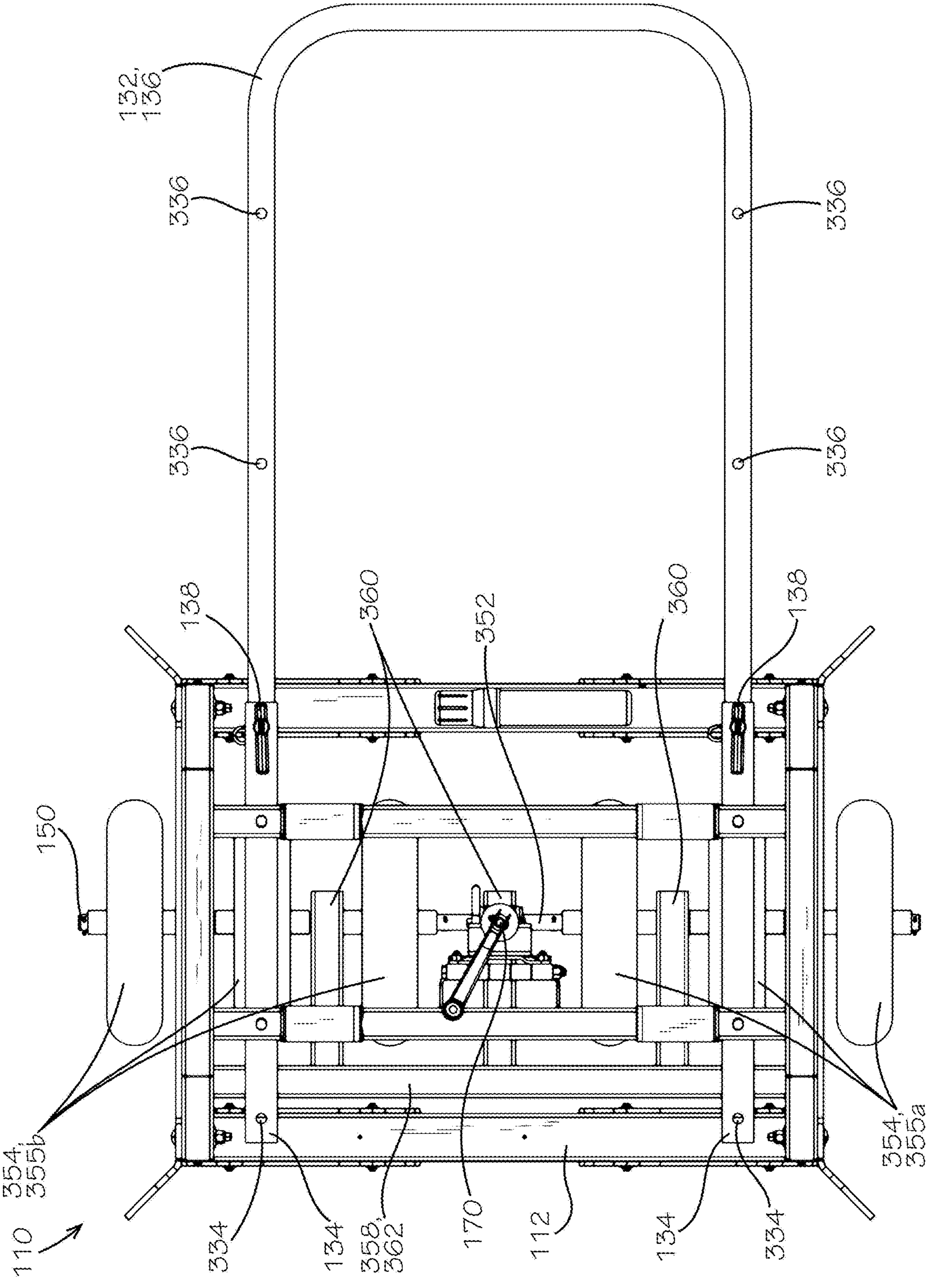
FIG. 3 is a top view of the cart of FIG. 1.
Figure 4:
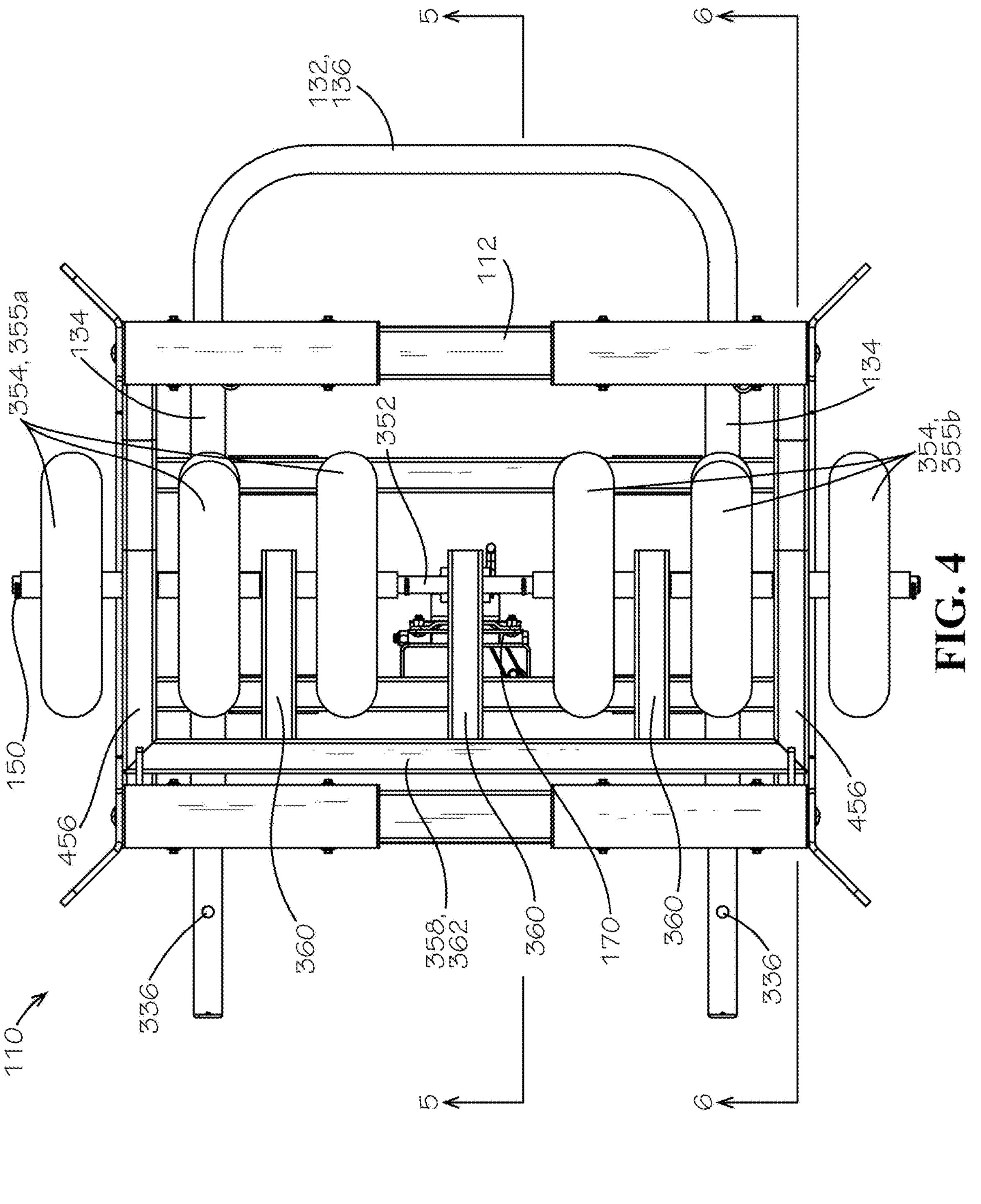
FIG. 4 is a bottom view of the cart of FIG. 1.

FIG. 3 is a top view of the cart 110 of FIG. 1 with the handle assembly 132 shown in extended configuration, and FIG. 4 is a bottom view of the cart 110 of FIG. 1 with the handle assembly 132 shown in the collapsed configuration. The at least one telescoping member 136 can define a plurality of retention holes 336. The at least one fixed member 134 can define a plurality of complimentary retention holes 334 (some of which receive and are obscured by the at least one pin 138 in FIG. 3). By removing the at least one pin 138, aligning different combinations of retention holes 334,336, and reinserting the at least one pin 138, the handle assembly 132 can be secured in a range of lengths. The collapsed configuration can correspond to a shortest length of the handle assembly 132. In some aspects, the extended configuration can correspond to a configuration of the handle assembly 132 that is longer than that of the collapsed configuration. In some aspects with more than two configurations of the handle assembly 132, the extended configuration can correspond to the longest configuration of the handle assembly 132, and configurations between the collapsed configuration and the extended configuration can be intermediate configurations.

The axle assembly 150 can be mounted to the frame 112. In some aspects, the axle assembly 150 can be hingedly coupled to the frame 112. The axle assembly 150 can be repositionable relative to the frame 112. The jack 170 can be coupled to each of the frame 112 and the axle assembly 150, and the jack 170 can be configured to reposition the axle assembly 150 relative to the frame 112. In the aspect shown, the jack 170 can be a screw or crank jack utilizing threaded members and/or gears to extend and collapse. In some aspects, the jack 170 can be a different type of lifting mechanism, such as a pneumatic, hydraulic, electric, or other type of suitable jack of lifting device. In some aspects, the jack 170 can be manually operated, and in some aspects, the jack 170 can be powered, such as with an on-board or off-board power supply, including but not limited to pneumatic, hydraulic, and electrical power supplies.

The axle assembly 150 can comprise an axle shaft 352, at least one wheel 354, at least one pivot arm 456 (shown in FIG. 4), a crossbar 358, and at least one support 360. The at least one pivot arm 456, the crossbar 358, and the at least one support 360 can at least partially define a pivot frame 362 of the axle assembly 150. The at least one pivot arm 456 can hingedly, or pivotably, couple the axle assembly 150 to the frame 112, as described below in greater detail with respect to FIG. 6. In the present aspect, the at least one pivot arm 456 can comprise a pair of pivot arms 456; however, in some aspects, the at least one pivot arm 456 can comprise greater or fewer than two pivot arms 456. The crossbar 358 can extend between the pair of pivot arms 456, and in some aspects, beyond, the pivot arms 456.

The crossbar 358 can coordinate a pivoting motion of the pivot arms 456. The at least one support 360 can extend between the crossbar 358 and the axle shaft 352 to support and provide rigidity to the axle shaft 352, which can minimize flexing of the axle shaft 352. In the aspect shown, the jack 170 can be coupled to a support of the at least one support 360.

The at least one wheel 354 can be rotatable relative to the pivot frame 362. In some aspects, the at least one wheel 354 can be rotatable about the axle shaft 352, which is to say the at least one wheel 354 can rotate relative to the axle shaft 352. In some aspects, the at least one wheel 354 can rotate with the axle shaft 352, which is to say the at least one wheel 354 can be rotationally fixed to the axle shaft 352.

In the present aspect, the at least one wheel 354 can comprise six wheels 354; however, in some aspects, the at least one wheel 354 can comprise greater or fewer than six wheels 354. One or more of the wheels 354 can be left wheels 355*a*, and one or more wheels 354 can be right wheels 355*b*. Some or all of the wheels 354 can be solid wheels, such as hard rubber or plastic wheels for example and without limitation, tires, such as pneumatic tubed or tubeless tires for example and without limitation, or a mix thereof.

Figure 5:
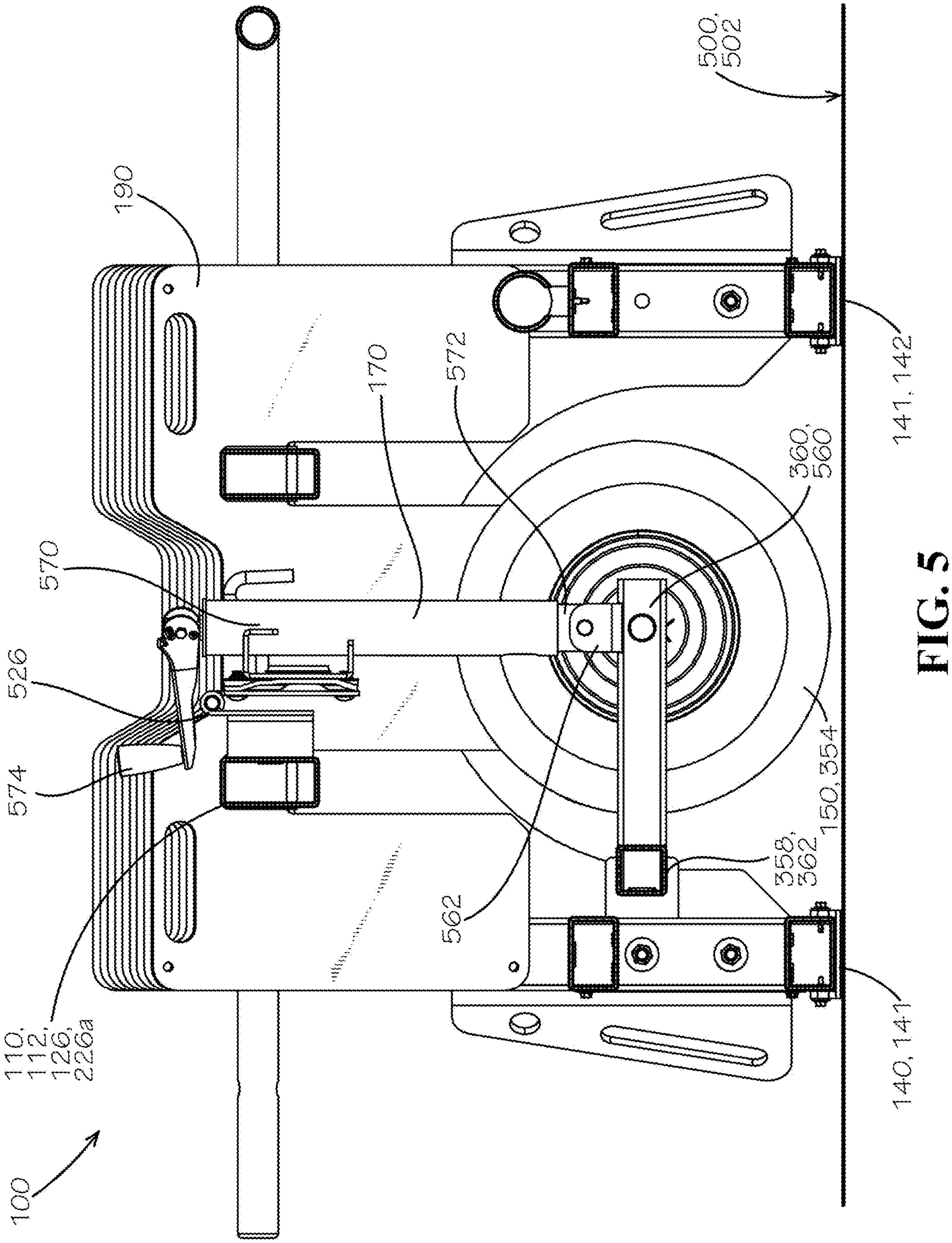
FIG. 5 is a side cross-sectional view of the anchor cart assembly of FIG. 1 taken along line 5-5 shown in FIG. 4.

FIG. 5 is a side cross-sectional view of the cart assembly 100 of FIG. 1, taken along line 5-5 shown in FIG. 4, resting on the ground surface 500 with the axle assembly 150 in the raised position. The frame 112 of the cart 110 can define a bottom plane 502. When the cart assembly 100 is resting on the ground surface 500 with the axle assembly 150 in the raised position, the ground surface 500 can contact the bottom plane 502. To the extent that the ground surface 500 is planar, the bottom plane 502 can be coplanar with the ground surface 500. In the present aspect, the at least one front foot 140 and the at least one rear foot 142 can define the bottom plane 502 of the frame 112. In some aspects, the footpads 141 of the feet 140,142 can define the bottom plane 502.

In the present aspect, the axle assembly 150 does not break the bottom plane 502 in the raised position. The axle assembly 150 can be spaced above the bottom plane 502 and the ground surface 500, as shown, in the raised position. For example, an entirety of the axle assembly 150 can be positioned above the bottom plane 502. In some aspects, the axle assembly 150 can rest upon the ground surface 500 in the raised position. In such aspects, the axle assembly 150 may break the bottom plane 502, such as where the ground surface 500 is irregular and dips downwards between the feet 140,142, and the at least one tire 354 may droop below the bottom plane 502. Additionally, in such aspects, the feet 140,142 can support a majority or an entirety of a weight of the cart assembly 100, including a weight of the load 190.

The axle assembly 150 can be reconfigured between the raised configuration and the lowered configuration (shown in FIGS. 7 and 8) by the jack 170. The jack 170 can comprise a top portion 570 and a bottom portion 572. The jack 170 can be configured to lengthen and retract. In the present aspect, the jack 170 can comprise an actuator 574, which can be utilized to reconfigure the jack 170. The jack 170 is shown in a collapsed configuration, which can position the axle assembly 150 in the raised configuration. The actuator 574 can be utilized to extend the jack 170 to an extended configuration (shown in FIG. 7) to place the axle assembly 150 in the lowered configuration. In the present aspect, the bottom portion 572 can telescope relative to the top portion 570. In other aspects, the jack 170 can extend by a different mechanism, such as by camming or scissoring as is common in a scissor jack, for example and without limitation.

The top portion 570 can be coupled to the frame 112. In the aspect shown, the top portion 570 can be coupled to the first top crossmember 226*a* of the at least one top crossmember 126 of the frame 112. A hinge 526 can couple the top portion 570 to the frame 112, thereby allowing the jack 170 to angle relative to the frame 112.

The bottom portion 572 can be hingedly coupled to the pivot frame 362. In the aspect shown, the bottom portion 572 can be pinned to a bracket 562 of the at least one support 360. In some aspects, the bottom portion 572 can be pinned to a center support 560 of the at least one support 360. When the jack 170 is lengthened, the crossbar 358 can coordinate a downward pivoting motion of the entire axle assembly 150, as described in greater detail with respect to FIG. 6.

Figure 6:
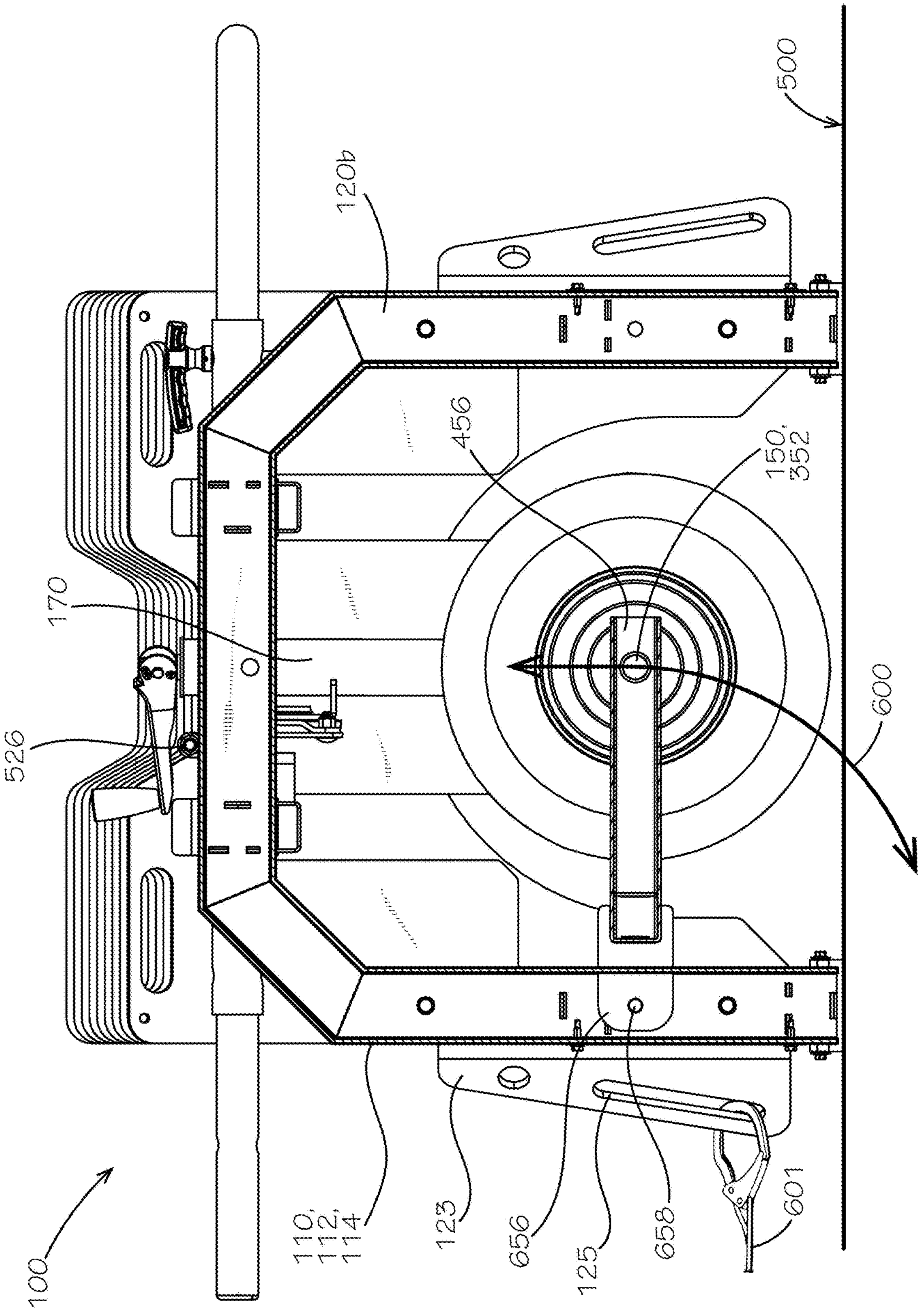
FIG. 6 is a side cross-sectional view of the anchor cart assembly of FIG. 1, taken along line 6-6 shown in FIG. 4, with an axle assembly of the cart in a raised position.

FIG. 6 is a side cross-sectional view of the cart assembly 100 of FIG. 1, taken along line 6-6 shown in FIG. 4, resting on the ground surface 500 with the axle assembly 150 in the raised position. In the present view, the weight stack 192*b* (shown in FIG. 1) is removed for clarity.

With the axle assembly 150 in the raised position, the frame 112 can rest upon the ground surface 500, and the cart assembly 100 can be immobile for practical purposes. In this configuration, the cart assembly 100 can act as an anchor for one or more workers 800 (shown in FIG. 8) to provide fall protection. The worker 800 can wear a body harness (not shown) with a lanyard 601 connected thereto. The lanyard 601 can be clipped into one of the attachment points 125, such as those defined by the wings 123. In some aspects, the attachment points 125 can be attached directly to the frame 112, such as by being welded or integrally formed with the frame 112. In applications for fall prevention, the cart assembly 100 can be positioned and the lanyard 601 can define a length cooperatively configured to prevent the worker 800 from reaching a ledge or other fall hazard (not shown). For fall arrest applications, the cart assembly 100 can be sufficiently heavy that if the worker 800 is attached to the cart assembly 100 and falls over the ledge, the cart assembly 100 can remain substantially in place as an anchor that can stop the worker's fall. For example, the cart assembly 100 can weigh hundreds or thousands of pounds, for example and without limitation.

The at least one pivot arm 456 of the axle assembly 150 can comprise a tab 656 positioned opposite from the axle shaft 352 on the at least one pivot arm 456. The tab 656 can be coupled to the frame 112 by a pin 658. In the present aspect, the tab 656 can be inserted into the frame 112 near the front end 114 of the cart 110. In the present aspect, the tab 656 can be received within the right arch 120*b*.

Figure 7:
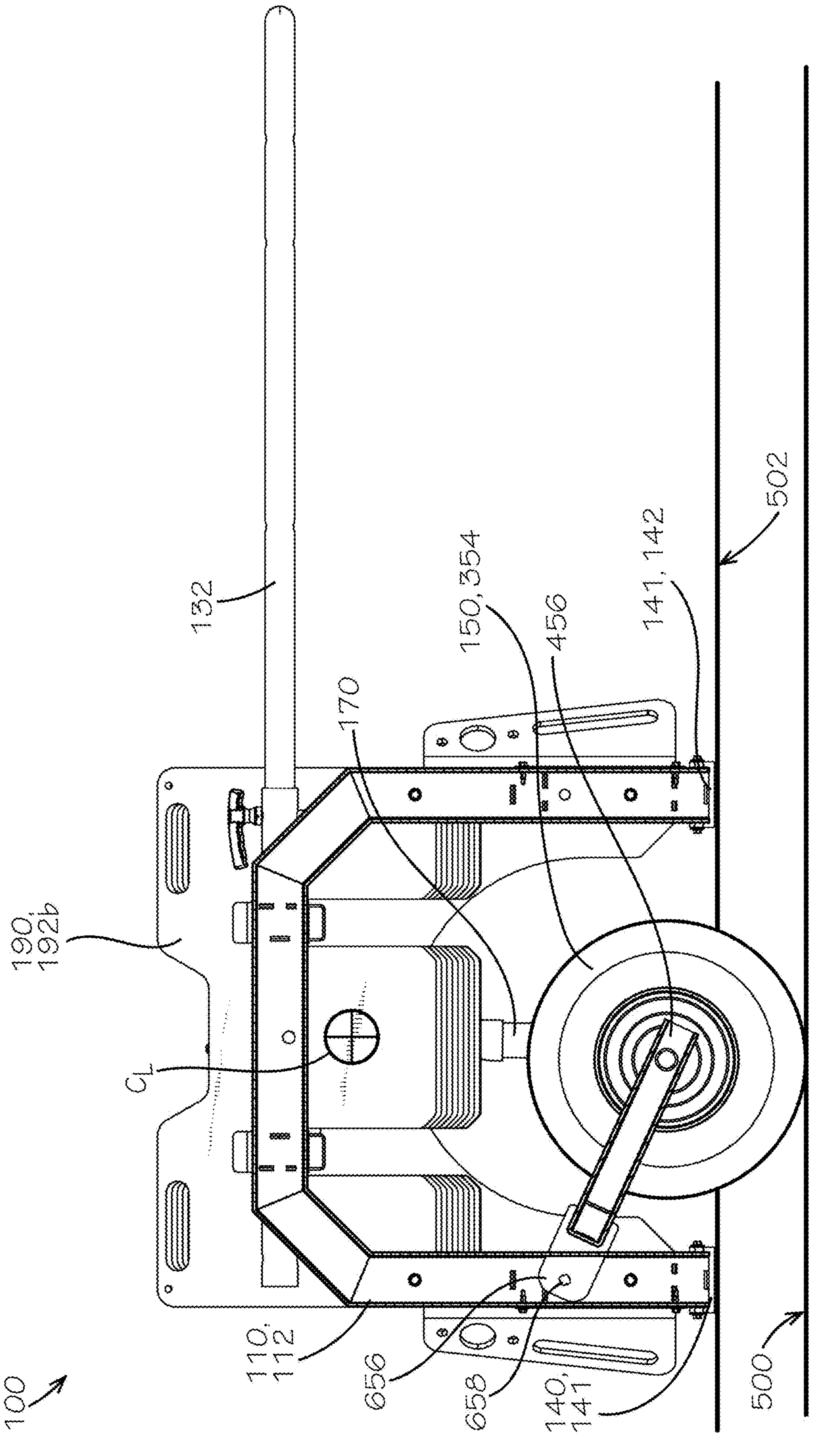
FIG. 7 is a side cross-sectional view of the anchor cart assembly of FIG. 1, taken along line 6-6 shown in FIG. 4, with the axle assembly of the cart in a lowered position.

The at least one pivot arm 456, and the axle assembly 150 as a whole can pivot relative to the frame 112 about the pin 658 along path 600 when the jack 170 is lengthened or retracted between the collapsed configuration (shown in FIG. 6) and the extended configuration (shown in FIG. 7). The path 600 can be an arc. The jack 170 can pivot at the hinge 526 as the axle assembly 150 travels along the arc.

FIG. 7 is a side cross-sectional view of the cart assembly 100 of FIG. 1, taken along line 6-6, shown in FIG. 4. The weight stack 192*b* of the load 190 is shown positioned on the frame 112. The cart assembly 100 is shown resting on the ground surface 500 with the axle assembly 150 in the lowered position and with the handle assembly 132 shown in the extended position. The axle assembly 150 can be placed in the lowered position by extending the jack 170 to the extended configuration, which can cause the axle assembly 150 to pivot around the pin 658 through engagement between the tab 656 of the pivot arm 456 and the pin 658.

In the present aspect, the axle assembly 150 can be in the lowered position when the jack 170 is in the extended configuration. In the lowered position, the axle assembly 150 can break that bottom plane 502, and at least a portion of the axle assembly 150 can be positioned below the bottom plane 502. With the axle assembly 150 in the lowered position, the axle assembly 150 of the cart 110 can be positioned in contact with the ground surface 500. Specifically, at least one wheel 354 of the axle assembly 150 can be positioned at least partially below the bottom plane 502 and can be in contact with the ground surface 500.

Figure 8:
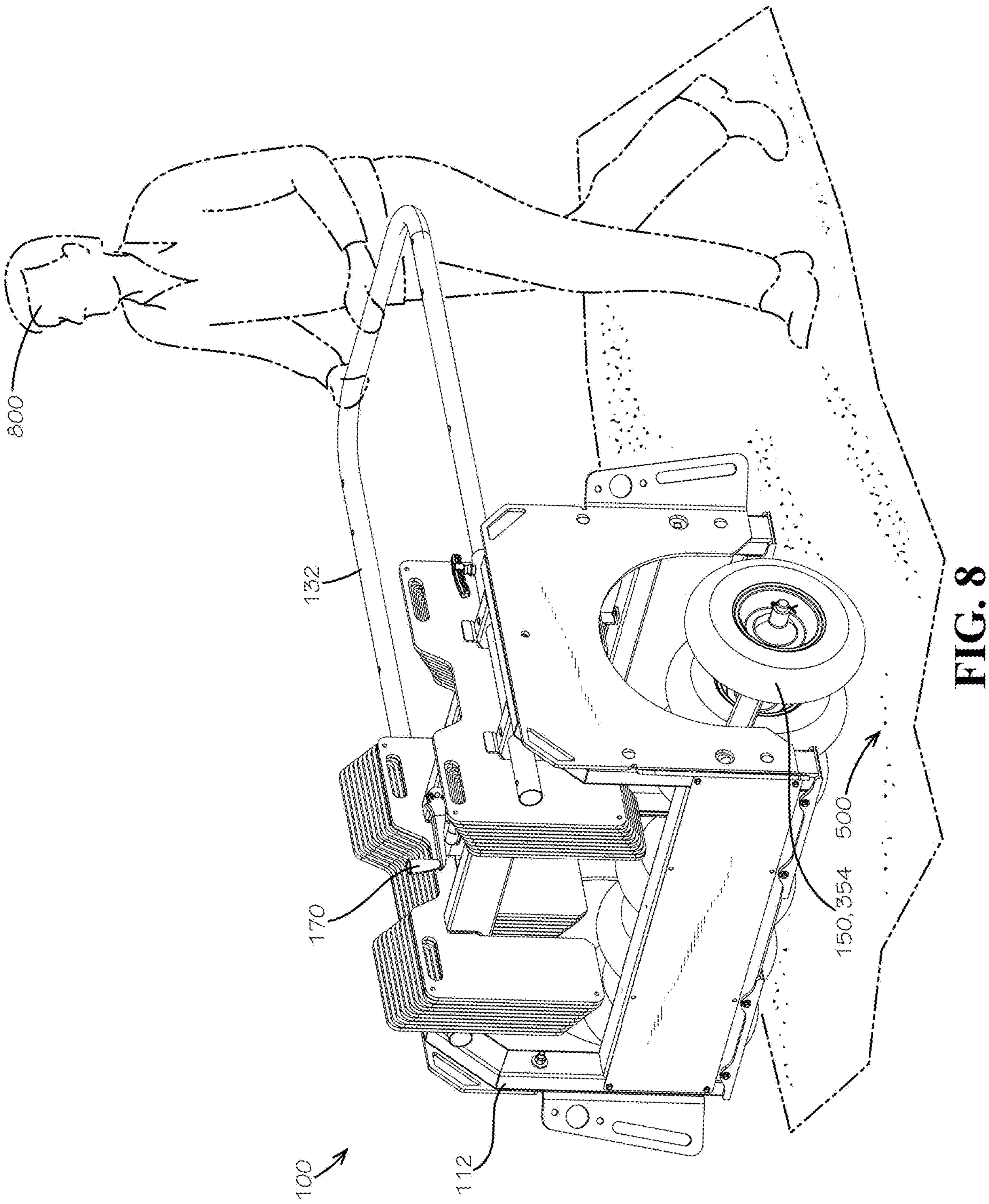
FIG. 8 is a front perspective view of the cart assembly of FIG. 1 with the axle assembly in the lowered position and a worker grasping a handle assembly of the cart.

The frame 112 of the cart 110 can be spaced above the ground surface 500 so that the frame 112 is out of contact with the ground surface 500 in the orientation shown. The orientation shown can be representative of when the worker 800 holds the handle assembly 132 to push the cart assembly 100 along the ground surface 500, as shown in FIG. 8. Returning to FIG. 7, in the aspect shown, the bottom plane 502 can be spaced above and positioned substantially parallel to the ground surface 500; however, in operation, the bottom plane 502 may not be parallel to the ground surface 500. For example, if the ground surface 500 is sloped or depending upon a height of the worker 800 and how the handle assembly 132 is supported by the worker 800, the bottom plane 502 can be angled relative to the ground surface 500. If the worker 800 releases the handle assembly 132, such as when the cart assembly 100 is initially rolled to a desired location on a worksite, the cart assembly 100 can tilt to a transition position wherein the at least one front foot 140 or the at least one rear foot 142 can rest upon the ground surface 500 along with the axle assembly 150. The at least one footpad 141 can comprise a material with a high friction coefficient, which can resist rolling of the cart assembly 100 in the transition position. The jack 170 can then be retracted to the collapsed configuration to raise the axle assembly 150 until it is out of contact with the ground surface 500, at which time both the at least one front foot 140 and the at least one rear foot 142 can rest on the ground surface 500.

The load 190 can define a load center of gravity $C_L$. As shown, the load center of gravity $C_L$ can be positioned over at least a portion of the axle assembly 150. The load center of gravity $C_L$ can be positioned over the at least one wheel 354. In some aspects, the load center of gravity $C_L$ can be positioned over the at least one wheel 354 when the bottom plane 502 is positioned parallel to the ground surface 500, for example and without limitation. By keeping the load center of gravity $C_L$ positioned over the axle assembly 150, the cart assembly 100 can be easily balanced with the handle assembly 132 when physically maneuvering and relocating the cart assembly 100, even when the load 190 defines a high weight, such as hundreds or thousands of pounds.

FIG. 8 is a front perspective view of the cart assembly 100 with the axle assembly in the lowered position and the worker 800 grasping the handle assembly 132. The scale of the worker 800 relative to the cart assembly 100 should not be viewed as limiting. With the axle assembly 150 in the lowered position, the worker 800 can roll the cart assembly 100 on the ground surface 500 with the at least one wheel 354 of the axle assembly 150. Once the cart assembly 100 is in a desired location, the worker 800 can operate the jack 170 to raise the axle assembly 150 to the raised position. With the axle assembly 150 raised, the cart assembly 100 can rest on the frame 112, thereby securing the cart assembly 100 in place on the ground surface 500.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of using an anchor cart assembly to provide fall protection to a worker, the method comprising:

rolling the anchor cart assembly along a ground surface to a work location, the anchor cart assembly comprising a cart and a load, the cart comprising a frame defining a front end and a rear end, the cart further comprising an axle assembly, the load configured to add weight to the cart, wherein the axle assembly is positioned in a lowered position;

tilting the anchor cart assembly to a transition position wherein the front end or the rear end of the frame rests upon the ground surface; and repositioning the axle assembly of the cart from the lowered position to a raised position, the load configured to immobilize the anchor cart assembly when the axle assembly is in the raised position;

wherein:

the cart further comprises a jack attached to the axle assembly;

repositioning the axle assembly of the cart from the lowered position to the raised position comprises raising the axle assembly with the jack;

a top portion of the jack is coupled to the frame and a bottom portion of the jack is coupled to the axle assembly;

the axle assembly comprises a first wheel and a second wheel; and the bottom portion of the jack is attached to the axle assembly between the first wheel and the second wheel.

2. The method of claim 1, wherein the frame defines a bottom plane, and wherein the ground surface is coplanar with the bottom plane when the axle assembly is in the raised position.

3. The method of claim 2, wherein the front end and the rear end contact the ground surface when the axle assembly is in the raised position.

4. The method of claim 1, wherein the cart further comprises at least one footpad configured to provide friction between the cart and the ground surface.

5. The method of claim 1, wherein the jack is a screw or crank jack.

6. The method of claim 1, wherein the jack is aligned vertically over the axle assembly.

7. The method of claim 1, wherein the top portion of the jack is coupled to a top crossmember of the frame.

8. The method of claim 1, wherein the bottom portion of the jack is configured to telescope relative to the top portion of the jack.

9. The method of claim 1, wherein raising the axle assembly with the jack comprises manual operation of the jack.

10. The method of claim 1, further comprising repositioning the axle assembly from the raised position to the lowered position by lengthening the jack to an extended configuration to lower the axle assembly and to raise the front end or the rear end of the frame above the ground surface.

11. The method of claim 1, wherein the axle assembly contacts the ground in the lowered position.

12. The method of claim 1, wherein the load comprises a removable weight plate supported by a crossmember of the frame.

13. The method of claim 1, wherein the frame further comprises a handle assembly comprising a telescoping member and a fixed member sized to receive the telescoping member, the method further comprising moving the telescoping member within the fixed member from an extended configuration to a collapsed configuration after rolling the anchor cart assembly along the ground surface to the work location.

14. The method of claim 1, wherein the axle assembly comprises a wheel mounted on an axle shaft, and wherein the wheel is positioned within the frame when the axle assembly is in the raised position and the wheel is at least partially below the frame when the axle assembly is in the lower position.

15. The method of claim 1, wherein the frame further comprises a wing extending outward from a corner of the frame and defining the attachment point.

16. The method of claim 1, wherein the frame further comprises a front plate coupled to the front end, a rear plate coupled to the rear end, and a pair of side plates each extending from the front end to the rear end at opposing sides of the frame.

17. The method of claim 1, wherein the load is configured to immobilize the anchor cart assembly when the axle assembly is in the raised position without the anchor cart assembly penetrating or digging into the ground surface.

18. The method of claim 1, further comprising anchoring the worker to an attachment point defined by the cart.

19. The method of claim 1, wherein the axle assembly contacts the ground surface in the lowered position.

20. The method of claim 1, wherein the frame is positioned above the ground surface at the front end and the rear end when the axle assembly is in the lowered position and the anchor cart assembly is rolling along the ground surface.

21. A method of using an anchor cart assembly to provide fall protection to a worker, the method comprising:

rolling the anchor cart assembly along a ground surface to a work location, the anchor cart assembly comprising a cart and a load, the cart comprising a frame defining a front end and a rear end, the cart further comprising an axle assembly positioned between the front end and the rear end, the load configured to add weight to the cart, wherein the axle assembly is positioned in a lowered position, the axle assembly contacting the ground surface in the lowered position, the frame positioned above the ground surface at the front end and the rear end when the axle assembly is in the lowered position and the anchor cart assembly is rolling along the ground surface;

repositioning the axle assembly of the cart from the lowered position to a raised position, the front end and the rear end contacting the ground surface when the axle assembly is in the raised position, the load configured to immobilize the anchor cart assembly when the axle assembly is in the raised position; and anchoring the worker to an attachment point defined by the cart;

wherein:

the cart further comprises a jack attached to the axle assembly and wherein repositioning the axle assembly of the cart from the lowered position to the raised position comprises raising the axle assembly with the jack the axle assembly comprises a first wheel and a second wheel, and wherein a bottom portion of the jack is attached to the axle assembly between the first wheel and the second wheel.

22. The method of claim 21, wherein the frame defines a bottom plane, and wherein the ground surface is coplanar with the bottom plane when the axle assembly is in the raised position.

23. The method of claim 21, wherein the cart further comprises at least one footpad configured to provide friction between the cart and the ground surface.

24. The method of claim 21, wherein the jack is aligned vertically over the axle assembly.

25. The method of claim 21, further comprising repositioning the axle assembly from the raised position to the lowered position by lengthening the jack to an extended configuration to lower the axle assembly and to raise the front end or the rear end of the frame above the ground surface.

26. The method of claim 21, wherein the load comprises a removable weight plate supported by a crossmember of the frame.

27. The method of claim 21, wherein the frame further comprises a handle assembly comprising a telescoping member and a fixed member sized to receive the telescoping member, the method further comprising moving the telescoping member within the fixed member from an extended configuration to a collapsed configuration after rolling the anchor cart assembly along the ground surface to the work location.

28. The method of claim 21, wherein the axle assembly comprises a wheel mounted on an axle shaft, and wherein the wheel is positioned within the frame when the axle assembly is in the raised position and the wheel is at least partially below the frame when the axle assembly is in the lower position.

29. The method of claim 21, wherein the frame further comprises a wing extending outward from a corner of the frame and defining the attachment point.

30. The method of claim 21, wherein the load is configured to immobilize the anchor cart assembly when the axle assembly is in the raised position without the anchor cart assembly penetrating or digging into the ground surface.

31. A method of using an anchor cart assembly to provide fall protection to a worker, the method comprising:

rolling the anchor cart assembly along a ground surface to a work location, the anchor cart assembly comprising a cart and a load, the cart comprising a frame defining a front end and a rear end, the cart further comprising an axle assembly, the load configured to add weight to the cart, wherein the axle assembly is positioned in a lowered position;

tilting the anchor cart assembly to a transition position wherein the front end or the rear end of the frame rests upon the ground surface; and repositioning the axle assembly of the cart from the lowered position to a raised position, the load configured to immobilize the anchor cart assembly when the axle assembly is in the raised position;

wherein the frame further comprises a front plate coupled to the front end, a rear plate coupled to the rear end, and a pair of side plates each extending from the front end to the rear end at opposing sides of the frame.

* * * * *